United States Patent [19]
Bowersox

[11] Patent Number: 5,785,266
[45] Date of Patent: Jul. 28, 1998

[54] VARIABLE DIAMETER FISHING LINE REEL FLANGE

[76] Inventor: Ross W. Bowersox, 315 W. Riverside, #607, Spokane, Wash. 99201

[21] Appl. No.: 745,785

[22] Filed: Nov. 8, 1996

[51] Int. Cl.$^6$ ............................................. A01K 89/01
[52] U.S. Cl. .................... 242/323; 242/322; 242/128; 242/140
[58] Field of Search ........................... 242/129, 128, 242/140, 322, 323, 593, 614, 607

[56] References Cited

U.S. PATENT DOCUMENTS

| | | | |
|---|---|---|---|
| 1,783,339 | 12/1930 | Mitchell | 141/140 |
| 2,535,746 | 12/1950 | Mitchell | 242/322 |
| 2,755,037 | 7/1956 | Sarah | 242/130 |
| 2,771,756 | 11/1956 | Burleson et al. | 242/128 |
| 2,957,641 | 10/1960 | Humphrey | 242/84.1 |
| 4,222,534 | 9/1980 | Ishida | 242/84.2 |
| 4,634,076 | 1/1987 | Eckert et al. | 242/118.7 |
| 5,161,751 | 11/1992 | Bolcavage | 242/322 |

*Primary Examiner*—Katherine Matecki
*Attorney, Agent, or Firm*—Wells, St. John, Roberts, Gregory & Matkin P.S.

[57] ABSTRACT

A variable diameter fishing reel fairlead is described. The diameter may be varied by provision of a number of rings that are radially nested at a forward flange of a spinning line spool, and that include individual line engaging bearing surfaces. Successive rings can be removed from the spool to progressively expose line engaging bearing surfaces of decreasing diameter as line on the spool diminishes in length.

20 Claims, 9 Drawing Sheets

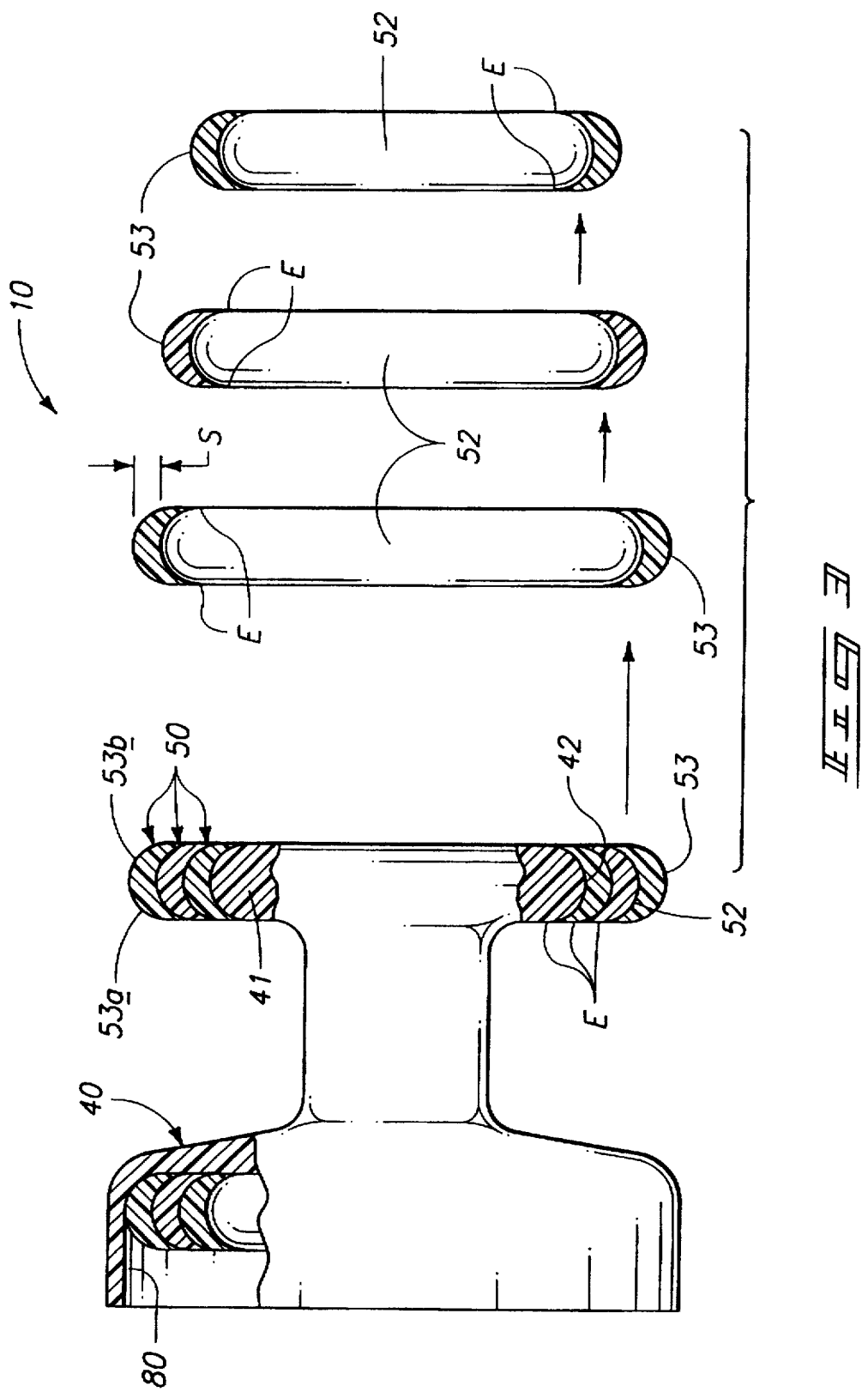

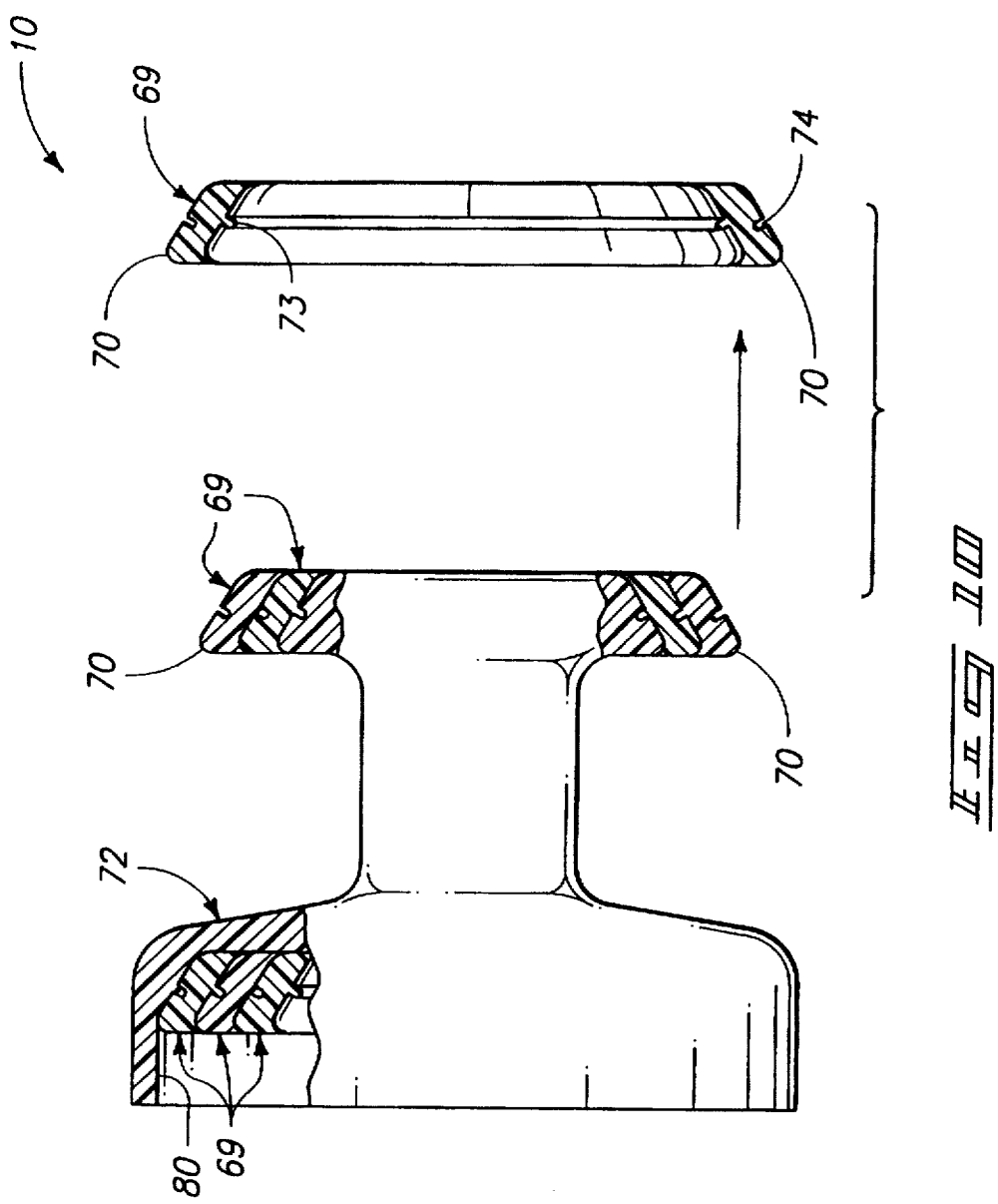

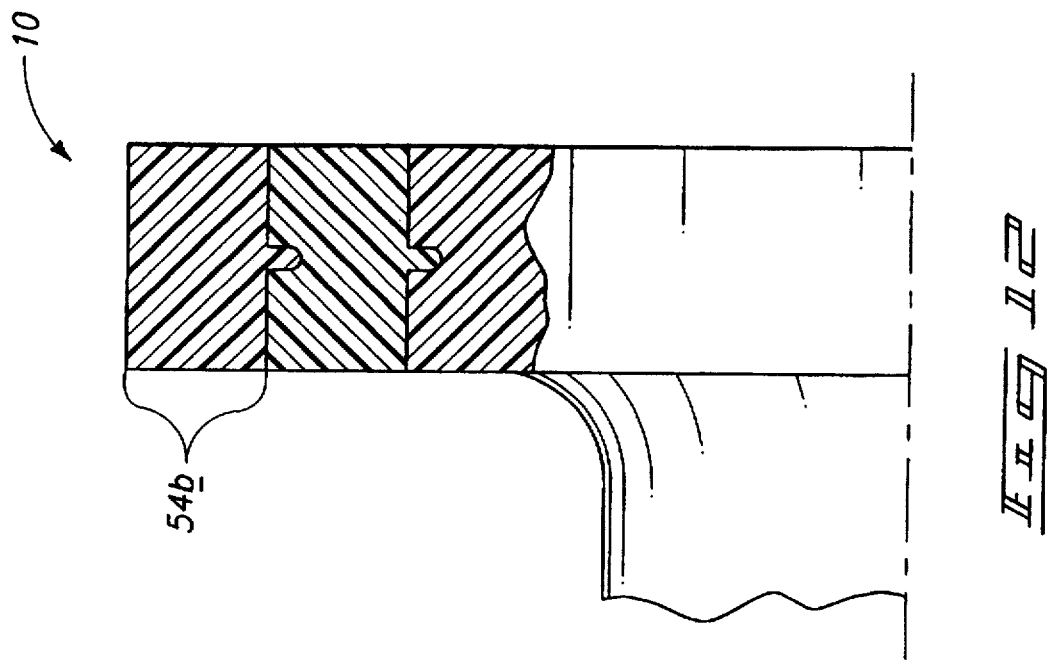
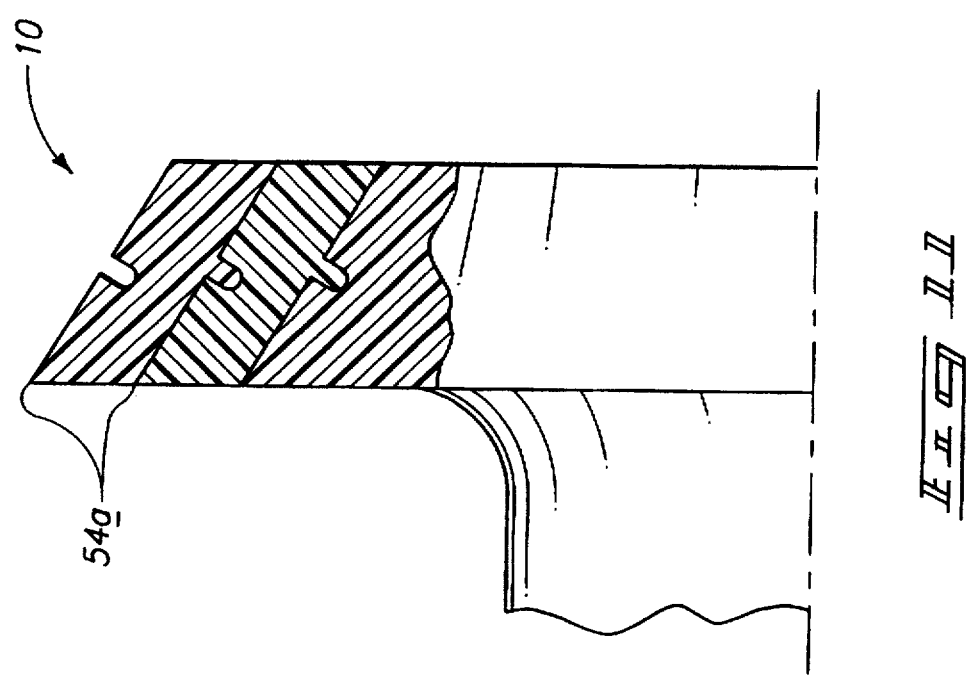

VARIABLE DIAMETER FISHING LINE REEL FLANGE

TECHNICAL FIELD

The present invention relates generally to alteration of the flange diameter on a fishing line spool, and more specifically to a variable diameter flange that is integrated with or is attachable to a fishing line spool.

BACKGROUND OF THE INVENTION

Modern spinning reels used for casting bait or lures over a distance have been a relatively recent development in the ancient art of fishing. The general idea involved with spinning reels is to minimize the amount of force required to strip fishing line from the spinning reel spool so the lure or bait may be cast a considerable distance from the fisherman. This is done in modern spinning reels using basically one of two general forms of reels, the open face spinning reel, and the closed face spinning reel. In either form, a spindle is provided for receiving a length of fishing line, which is wrapped around the spindle in courses about an axis that is substantially parallel to the fishing pole to which the reel is mounted.

The wrapping step is performed either by winding the line onto a relatively stationary spindle, by rotating the spindle to collect the line, or by rotating the spindle while simultaneously winding the line. This action is accomplished by the line take-up mechanism provided on the reel. The take-up mechanism is used only when line is being taken up, and is not used for casting. Open and closed face spinning reels are distinguishable in this aspect over bait casting reels where the spool is rotated both when taking up the line and when casting.

When the line is to be payed out, as when casting, the spinning reel take up mechanism is released, freeing the line to be stripped from the spindle when the bait or lure is cast.

Typically the line leaving a spindle must first pass over a flange at the outward end of the spindle. The flange is used simply to maintain the unused porions of the line on the spindle, and the outer annular rim of the flange necessarily offers frictional resistance to release of the line. This frictional resistance increases as the effective outer diameter of the windings on the spindle decreases, due to the increasing angle between the surface of the windings and the fixed diameter annular bearing surface of the spool flange.

It may thus be understood that as the effective outer diameter of the windings decreases, casting distances are reduced. This is of course due to the ever increasing amount of frictional resistance offered by the fixed diameter of the flange.

From the above, it becomes understood that to maintain optimal casting distance, the diameter of the windings on the spindle must be kept relatively close to the outer diameter of the spool flange over which the line must pass. While this is possible with a fresh spool of line, eventual loss of line will result in reduction of the effective diameter at the surface of the windings, and consequent loss of casting distance.

The problem is solved by replenishing line periodically, to maintain the desired winding surface diameter to flange diameter relationship. However this is an expensive and time consuming task, since it is best to replace all the line on the spool. It is not advisable to simply splice new line onto old. Splicing knots are typically weaker than the line strength, cause undesirable "bumps" when wound onto the spindle, and will snag on the reel flange during casting, then snag again on each line guide eyelet of the fishing rod as the line is payed out. Thus casting distance is again sacrificed and nothing is gained by the splice other than overall increase in line length.

In view of the above problem, it is a primary objective of the present invention to provide a spinning reel spool flange of variable diameter that can be selectively adjusted to maintain a close relationship between the flange diameter and the effective diameter of the windings on the spinning reel spindle.

The above and still further objects and advantages will be understood from the following description, drawings, and claims.

BRIEF DESCRIPTION OF THE DRAWINGS

Preferred embodiments of the invention are described below with reference to the following accompanying drawings.

FIG. 3 is an exploded, partially fragmented side elevation view of a variable diameter flange and spool of a first preferred form of the present invention;

FIG. 10 is an enlarged fragmented view of another preferred form of the present invention;

FIG. 11 is an enlarged fragmentary view illustrating another preferred flange ring configuration;

FIG. 12 is an enlarged fragmentary view of another preferred flange ring configuration; and FIG. 13 is a view of a spinning reel mounted to a fishing pole.

DETAILED DESCRIPTION OF THE PREFERRED EMBODIMENTS

Figure 1:
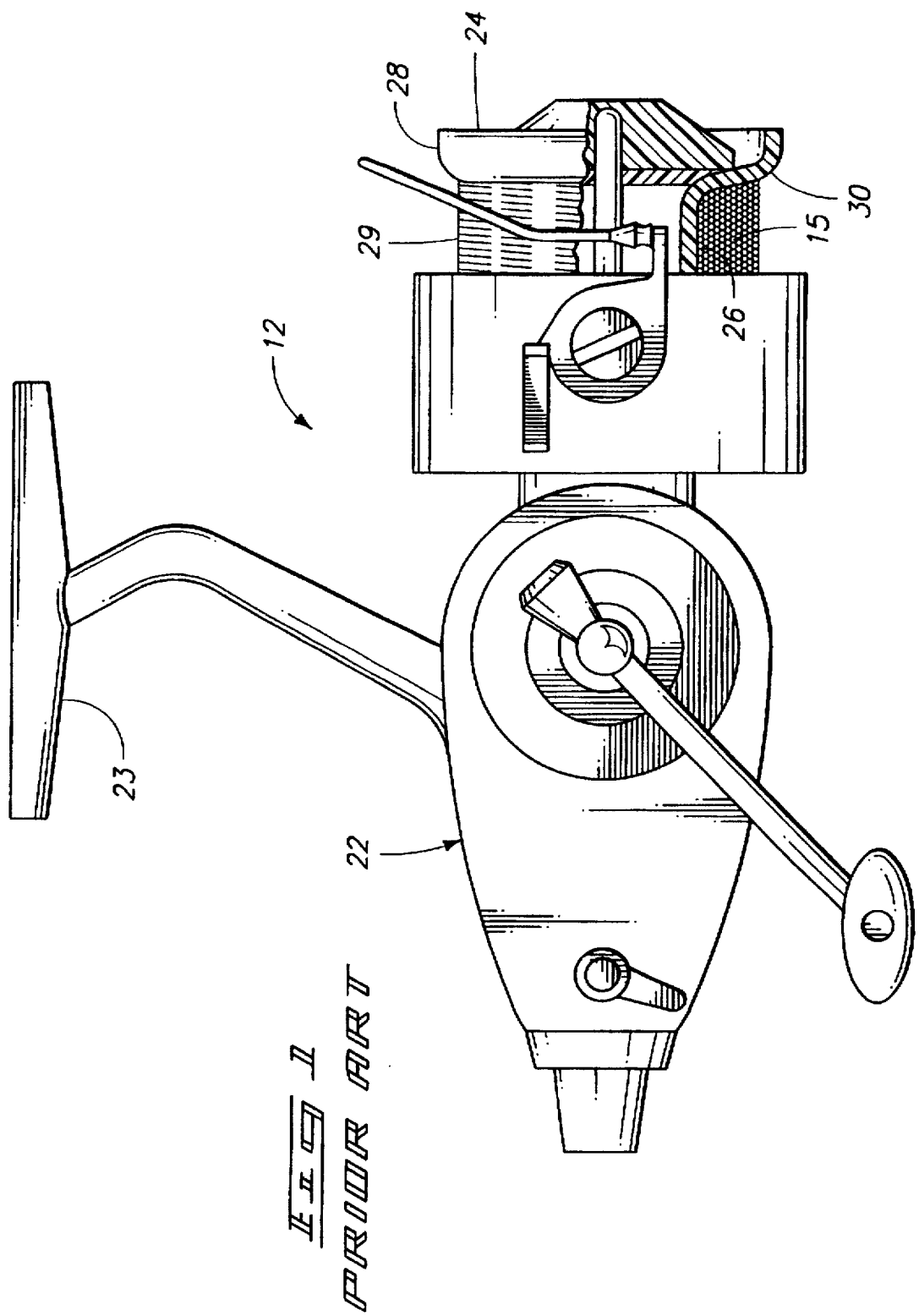
FIG. 1 is a side elevation view of a prior art form of spinning reel.

This disclosure of the invention is submitted in furtherance of the constitutional purposes of the U.S. Patent Laws "to promote the progress of science and useful arts" (Article 1, Section 8).

A preferred embodiment of a variable diameter fishing line spool flange is exemplified in the drawings and is generally designated therein by the reference numeral 10. A more detailed description of the preferred embodiment will be discussed below, but as a preface, an initial description of a typical prior art spinning real and fishing rod will first be given.

Figure 2:
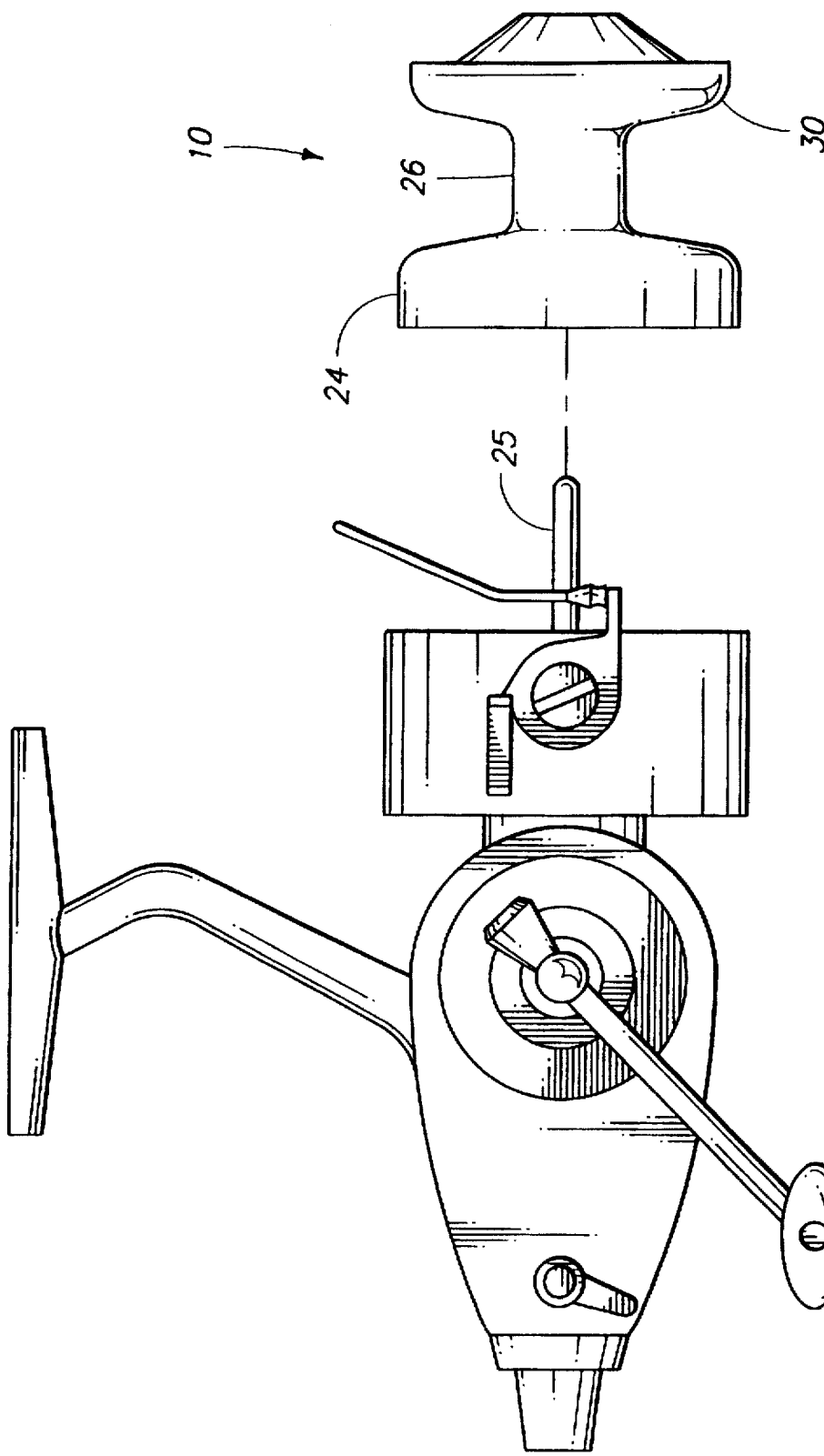
FIG. 2 is an exploded view of a prior art spinning reel.

FIGS. 1, 2 and 13 are included to show a prior art fishing reel and a fishing pole, designated by respective numerals 12 and 14. The typical fishing pole 14 shown in FIG. 13 includes a hand grip 16 at one end, to which a spinning reel 12 is mounted. Fishing line 15 extends from the reel 12 along the rod 18 and is guided along the rod length through successive eyelets 20 to a bait or lure 21. In casting, the fishing pole 14 is grasped at the handle 16 and is swung forcefully through an arc, the approximate center of which being the fisherman's elbow. At a selected point in the swing path, the line 15 is released, allowing the bait or lure 21 to fly in a desired direction and pull line from the reel 12. The forward momentum of the bait or lure 21 will strip line from the reel, and pull it through the eyelets 20.

An important factor determining the casting distance is the amount of frictional resistance offered by the reel. This may be understood with reference to FIGS. 1, 2, and the remaining simplified description of the reel 10.

A spinning reel, one form of which is shown in FIGS. 1 and 2, includes a reel body 22 with a foot 23 that adapts the reel for mounting to a fishing rod 18. The typical spinning reel body 22 includes a spool shaft 25 that mounts a spool 24 with a central spindle 26 for receiving and storing the line 15. The line 15 is wound about the spindle 26 in a series of layers, one on another until the layers reach the approximate (but less than) the outer diameter of the forward flange 28 of the spool. It important to note that the most desirable maximum diameter of the line windings 29 on the spool is slightly less than the maximum diameter of the flange 28, so that line friction against the outer flange edge surface 30 will be minimal during casting.

It is also important to note that the known prior art forms of spools 24 include integrated spindles 26 and flanges 28, and that the maximum diameter of the flange 28 is fixed. Thus when the line is gradually shortened as when lengths are lost due to snags or other misadventures, the diameter of the windings 29 becomes reduced. As the diameter grows smaller, rubbing frictional resistance between the line and the flange surface 30 increases. The casting distance likewise suffers.

Another consideration to bear in mind is that though an "open face" spinning reel is shown and described herein, the present invention may be useful with other forms of spinning type reels. Many different manufacturers produce reels similar to that shown, and further details of their construction is not necessary to gain on understanding of the present invention.

Figure 5:
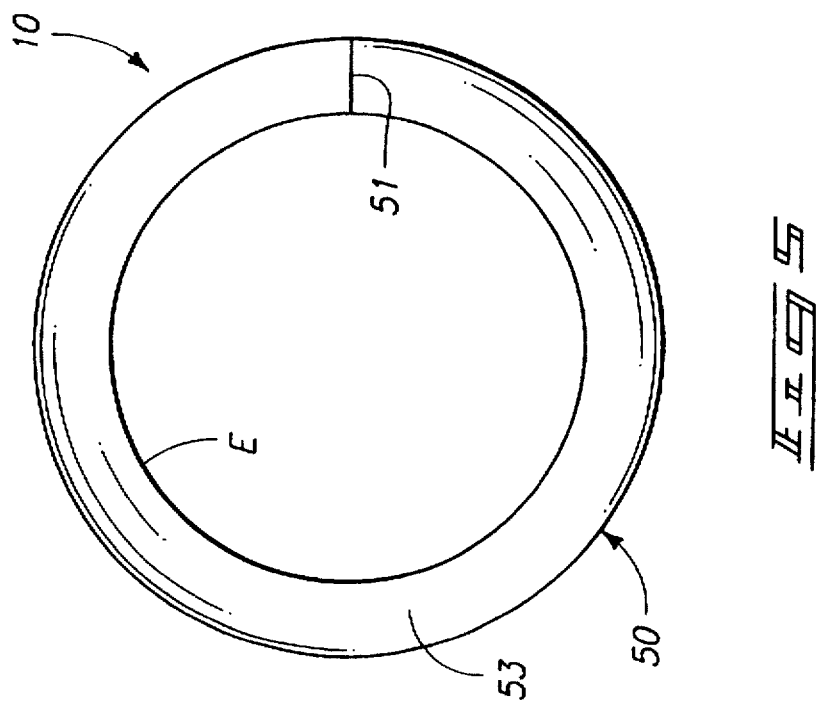
FIG. 5 is a view of another preferred flange ring.
Figure 4:
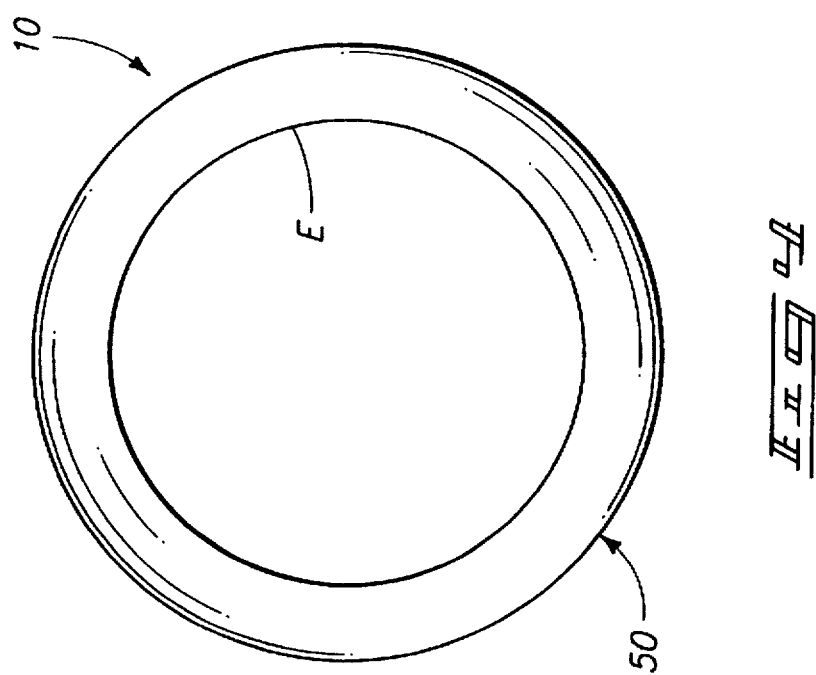
FIG. 4 is a frontal elevational view of a single flange ring of one preferred form.
Figure 6:
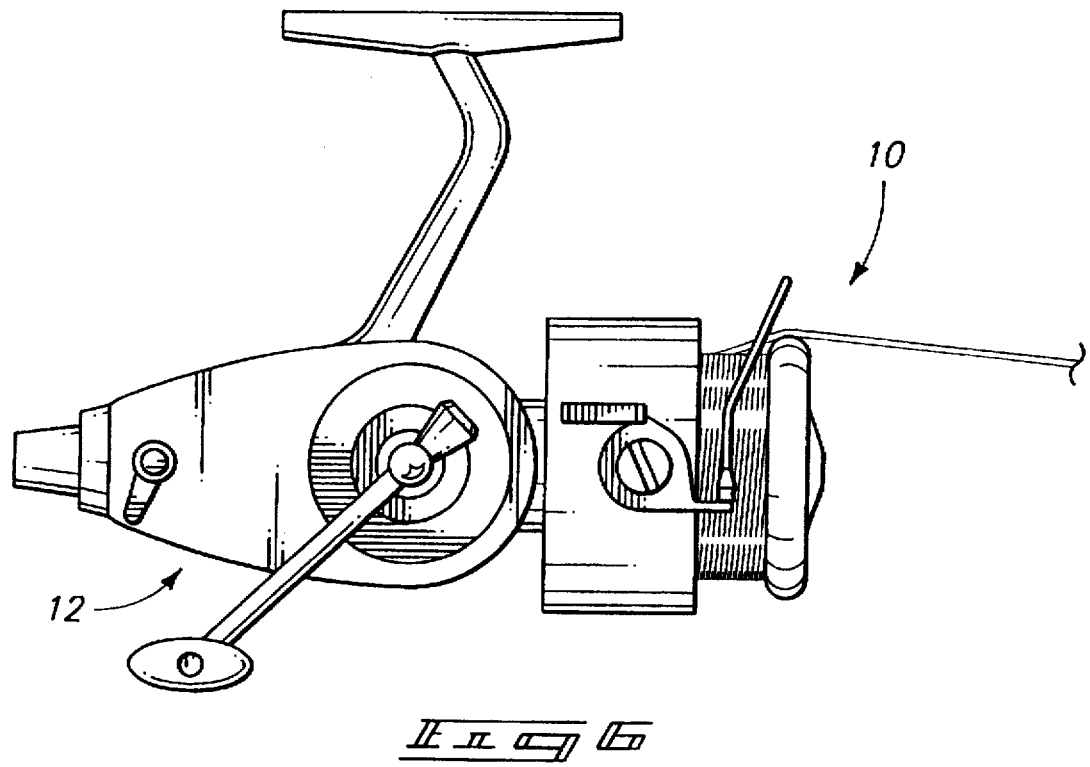
FIGS. 6-9 are a succession of views showing removal of successive rings to accommodate lines of varying length.
Figure 7:
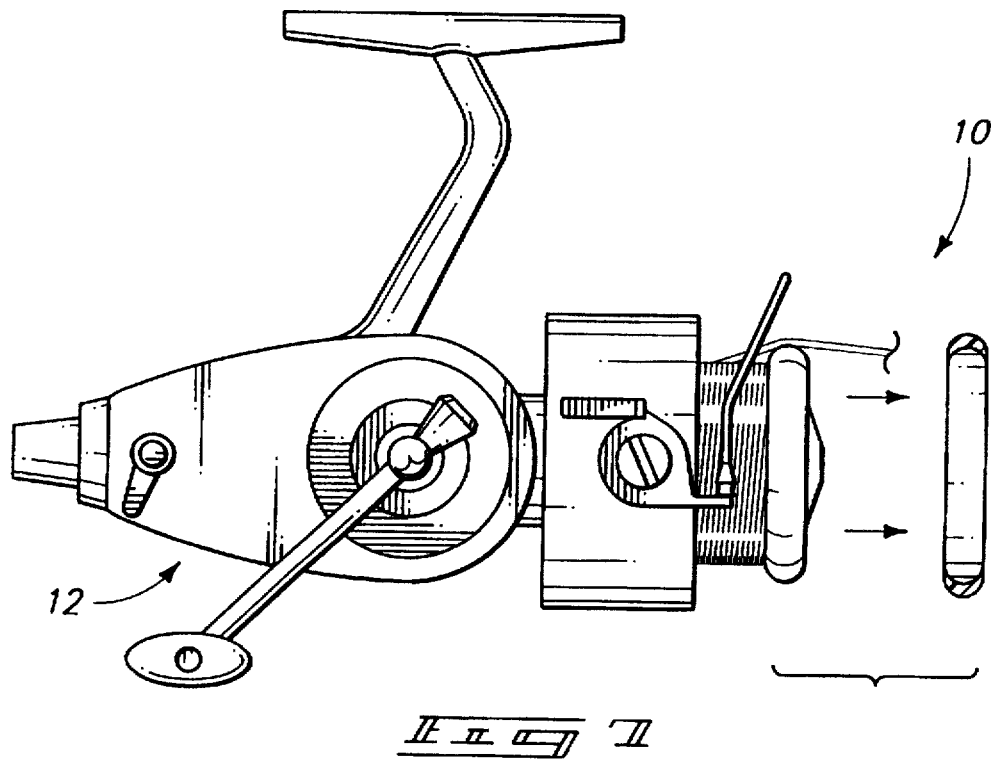
Figure 8:
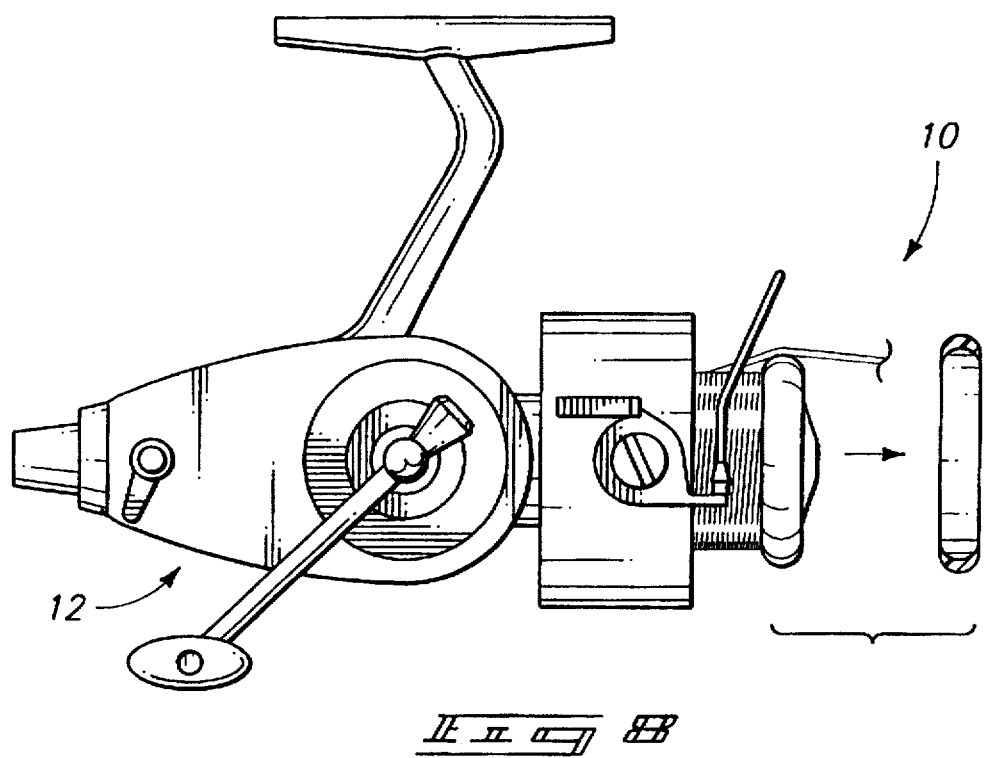
Figure 9:
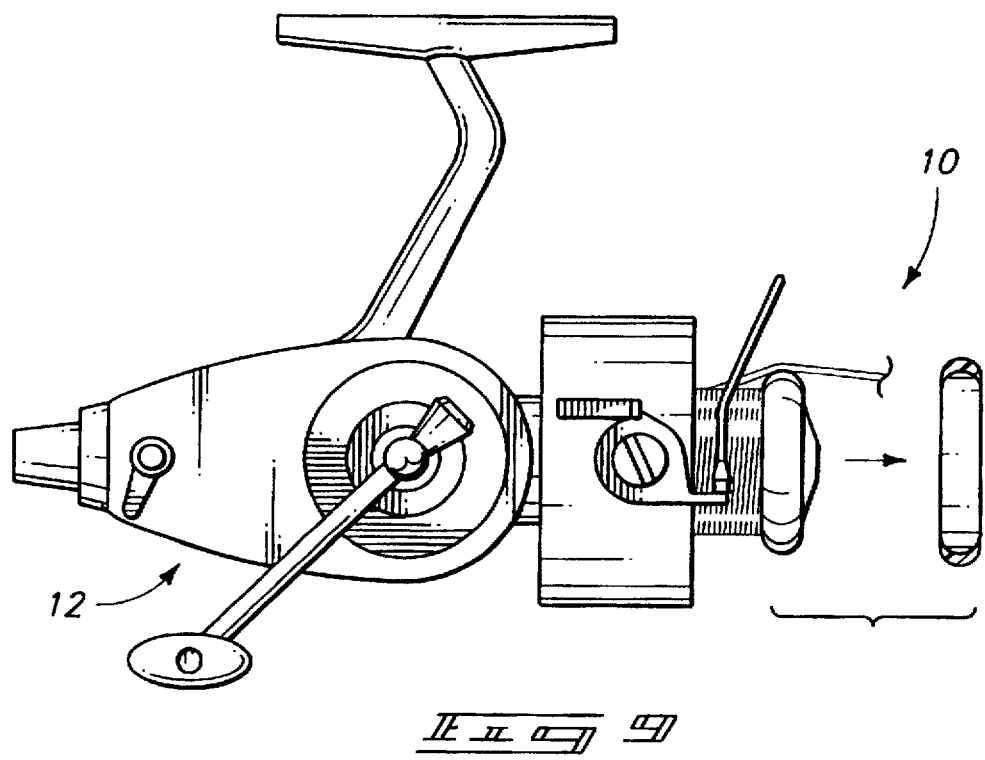
Figure 17:
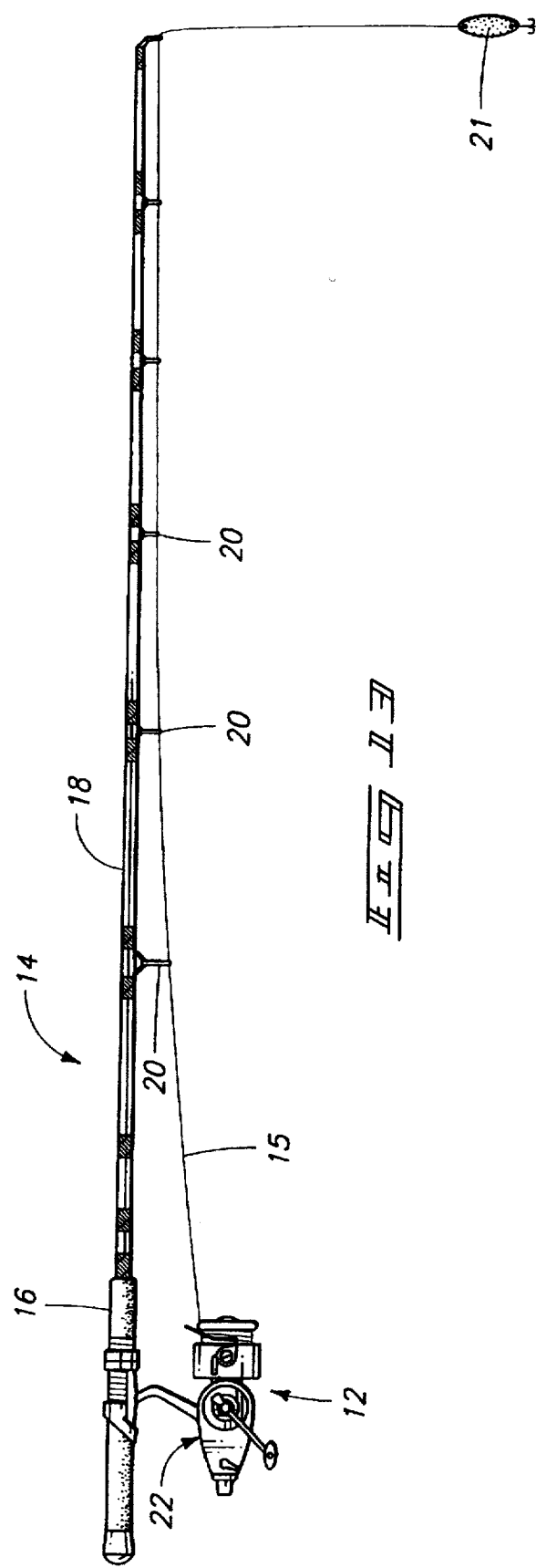

First preferred forms of the invention are shown in FIGS. 4 and 5. FIG. 3 shows the invention in combination with a spinning reel spool for attachment to existing forms of spinning reels. The invention may also be provided as shown in FIGS. 6–9, in combination with a conventional spinning reel 12. FIGS. 6–9 also exemplify operation of the forms illustrated in FIGS. 3–5. A still further form is shown in FIG. 10 which includes a spinning reel spool and modified detachable flange combination. Other forms not illustrated may also be envisioned that fall within the scope of the invention as defined in the claims appended hereto.

In one preferred form, the present adjustable diameter flange 10 is exemplified as at least one annular elastic member or ring 50 (FIGS. 4 or 5) that is configured to be mounted to an existing flange 28 of a spinning reel 12. In such instances, the ring or rings 50 will be produced with interior, annular configurations that will be shaped to mate with the largest external diameter and configuration of the existing spool flange 28.

In another preferred form (FIG. 3) a novel spool 40 having a forward flange 41 with an outward perimeter is configured to receive a radially nested stack of the rings 50. The preferred rings 50 will each have a crescent shaped, tapering cross-sectional configuration as shown in FIG. 3 with a thick central section S, leading axially to opposed annular thin edges E. The thin edges E are provided to produce a smooth, unobstructed transition to the inner face of the forward spool flange. The edges E are at the terminus of an annular smooth arcuate external line engaging bearing surface 53 and an annular concave internal surface 52.

The individual rings 50 are preferably formed of an elastic material that will enable resilient radial expansion and retraction. By this provision, the rings may be selectively expanded to be fitted over the spool flange 41, then released to grip the flange perimeter. This may also be termed a "snap" fit, with the ring 50 being initially expanded radially as the edges E are slipped axially over one another when being fitted to or removed from the spool 40.

The rings 50 may alternatively be produced with each having an expansion joint 51 formed between its internal annular surface 52 and the external annular line engaging bearing surface 53. An example of this embodiment is shown in FIG. 5, where the expansion joint 51 is formed on a radial plane to avoid snagging the line during casting. The joint 51 could also be angled axially forming an expandable scarf joint, angled in the same direction as the line winding to avoid snagging the line during casting.

In one preferred form, the external line engaging bearing surface 53 is smooth and axially curved to present a low friction area over which the line is fed during casting. Other preferred configurations 54a and 54b make use of more abrupt edge bearing surfaces.

As shown in FIG. 3, the overall bearing surface 53 is comprised of two conjoined annular surfaces 53a, 53b formed on each ring 50 in axial mirror image symmetry. The surfaces 53a, 53b are arranged in this manner to enable each ring 50 to be reversed and re-used once one surface 53a or 53b wears out. Since two such bearing surfaces 53a, 53b are provided for each ring, the useful life of the present adjustable flange is effectively doubled.

In the FIG. 3 version a spool 40 and at least one of the rings 50 are combined, and the complete assembly is configured to be attached to a spinning reel. Special consideration is made in this form to the configuration and diameter of the forward flange 41 of the spool 40. The flange 41 may be shaped to accept the rings 50, and to include a relatively small flange diameter with an annular flange bearing surface 42 that can be used along with the succession of rings to accommodate diminishing line lengths.

It is also pointed out that the present variable diameter flange can be produced as in combination with an existing form of spinning reel. In this embodiment, the actual structure of the reel and reel components may take any number of conventional forms, and the variable diameter flange provided as described above.

The embodiment illustrated in FIG. 10 is a variation of the multiple ring version of the invention, except that here only one outward bearing surface 70 of each ring 69 is exposed to a spool 72. This configuration facilitates mounting and dismounting of the successive rings 69 to and from the spool 72 due to the tapered, frusto-conical shape at the forward ring surfaces. To further assist secure positioning of the rings in nested proximity, annular beads 73 are preferred for reception within annular grooves 74 formed in the next successive ring. Once again, the spool 72 is specially constructed to receive the rings. This interconnection configuration can also be used with the ring shapes exemplified in FIGS. 11 and 12, or for other conceivable ring shapes or sizes.

In any of the various embodiments described above in which a spools are provided in combination with flange adjustment rings for varying the flange diameter, special provisions may also be made for storage of used rings. Successive rings removed from the nested stack may be placed in a specially shaped receptacle 80 (FIG. 3) formed in the back of the spool. The diameter of the receptacle 80 is such that the largest ring will fit snugly therein, and each ring thereafter will be received and held within the confines of the preceding ring. This eliminates the likelihood that any of the rings will be lost, since ample space is provided near the flange for ring storage.

In practice, it is considered quite possible and even advantageous that the combined spool and adjustable flange 10 be supplied and provided to consumers with fishing line pre-wound thereon. Line may be wound onto the spools at the line producer or distributor's facility. Thus a novel spool with an adjustable flange can be supplied pre-filled with line to retail customers who may purchase the spool, adjustable flange, and line as a combination for attachment to an existing spinning reel. This novel approach will allow the consumer to have a much wider selection of line weights and characteristics, by enabling interchangeability of one pre-wound spool for another on the same fishing reel. The fisherman can purchase several spools, each having a particular weight line wound thereon, and all will be interchangeable on a selected spinning reel.

In operation, the present invention provides a selection of flange diameters to accommodate a fishing line that will gradually diminish in length over time, due to snags, entanglements, backlash, etc. This is done by reducing the maximum flange diameter as the winding diameter of the line on the spool spindle diminishes. In the examples described above, diametral adjustment is made simply by removing or adding successive rings from the spool, thereby progressively exposing larger or smaller diameter line engaging bearing surfaces. This sequence is shown progressively by FIGS. 6–9. Rings are removed simply by prying the outermost ring axially forwardly (toward the rod eyelets) to dislodge the ring from the next successive ring in the nested stack. The newly exposed ring will have an effective outer bearing surface much closer to the actual diameter of the line windings on the spool.

Of course, if fresh line is added to the reel, the successive rings can be re-assembled to the radial nested configuration shown in FIG. 3. This is done simply by snapping the rings together over the forward flange of the spool.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is therefore claimed in any of its forms or modifications within the proper scope of the appended claims appropriately interpreted in accordance with the doctrine of equivalents.

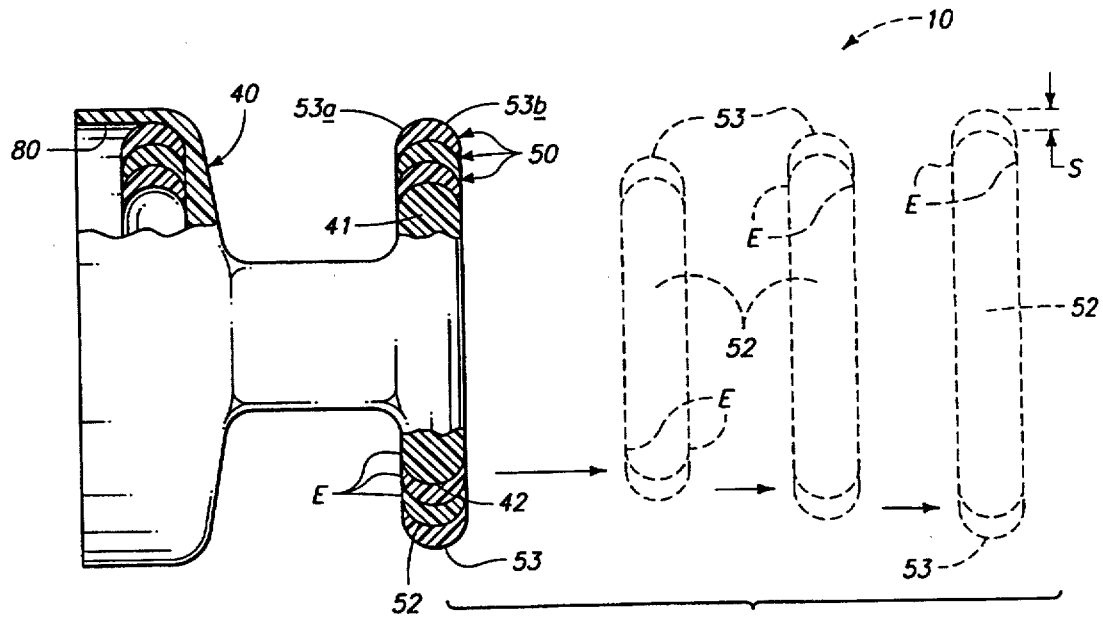

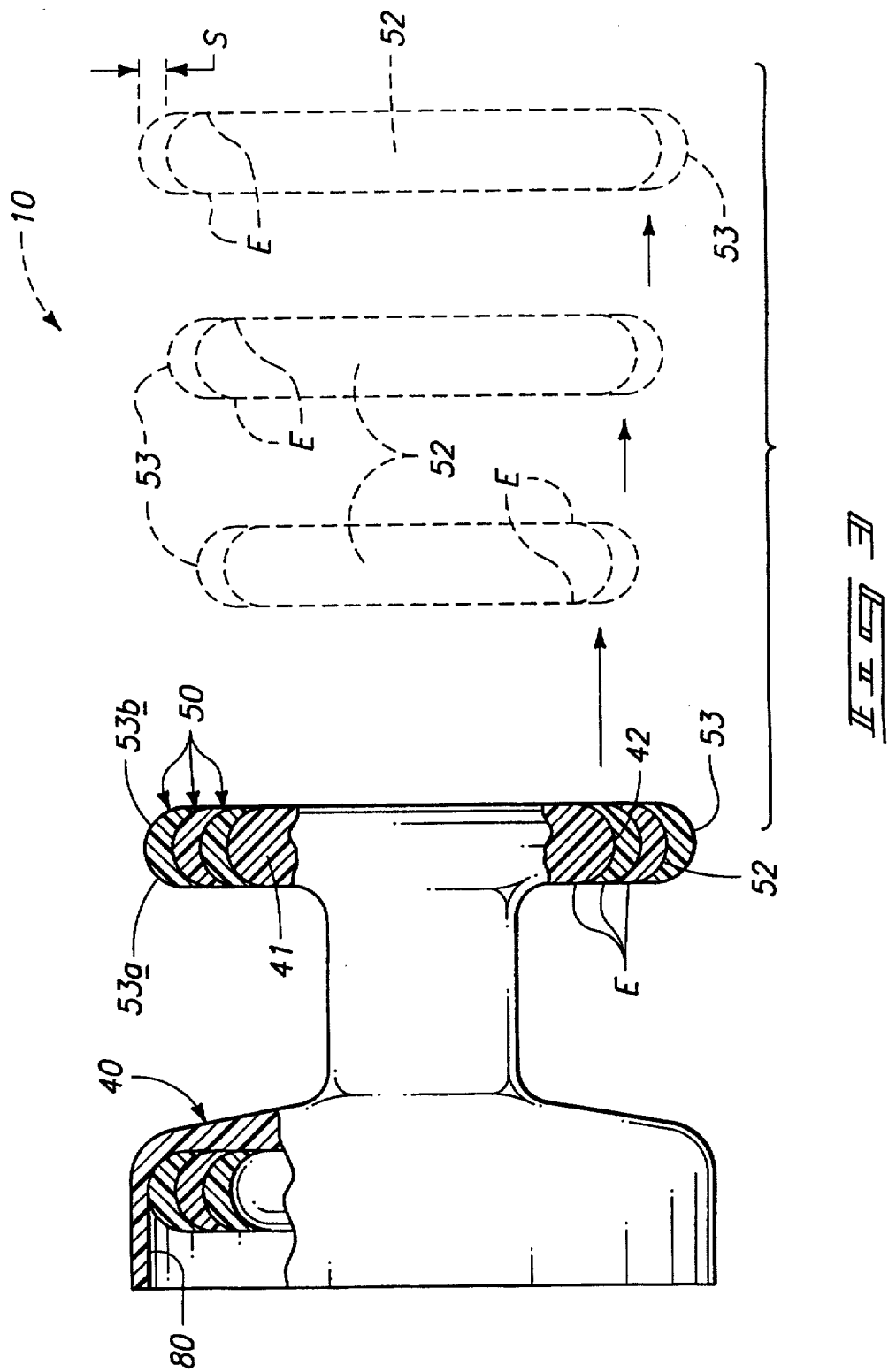

I claim:

1. A fishing reel spool flange attachment for a fishing reel spool having a spool flange, the attachment comprising at least one ring having at least one external annular line bearing surface and an internal surface configured to be mounted to the spool flange to position the external annular line bearing surface in circumferential relation to the spool flange.

2. A fishing reel spool flange attachment as claimed by claim 1, wherein a set of said rings are nested in substantial concentricity, presenting a plurality of external annular line bearing surfaces of varying diameters.

3. A fishing reel spool flange attachment as claimed by claim 1, wherein said at least one ring is comprised of an elastic material configured to yieldably encircle the fishing reel spool flange.

4. A fishing reel spool flange attachment as claimed by claim 1, in which said at least one ring is formed of an elastic material and wherein the external annular line bearing surface is configured to be axially reversible on the spool flange.

5. A fishing reel spool flange attachment as claimed by claim 1, in which said at least one ring includes an expansion joint that enables radial expansion of said at least one ring for selective mounting to and removal from the spool flange.

6. A fishing reel spool flange attachment as claimed by claim 1, in which said at least one ring is formed of an elastic material and further including an expansion joint formed between the internal surface and the external annular line bearing surface.

7. A fishing reel spool flange attachment as claimed by claim 1 in which the external annular line bearing surface tapers to an annular edge.

8. A fishing reel, comprising:
a reel body;
a line receiving spool mounted to the reel body along a spool axis and having a spindle disposed between a forward spool flange and an axially spaced rearward flange;
a spool base mounting the line receiving spool to the reel body along the spool axis;
a winding assembly including a crank and a line take up and release frame for selective operation to respectively take up line onto the spindle and release line from the line receiving spool over the forward spool flange; and
at least one ring removably mounted to the forward spool flange and having least one external annular line bearing surface disposed radially outward of and circumscribing the forward spool flange.

9. A fishing reel as defined by claim 8, wherein said at least one ring includes an internal annular surface releasably mountable to the forward spool flange.

10. A fishing reel as defined by claim 8, wherein the external annular line bearing surface includes two peripheral bearing surfaces that are in axial opposition on said at least one ring, and wherein said at least one ring is configured to enable axially reversible positioning of said at least one ring on the forward spool flange.

11. A fishing reel as defined by claim 8, wherein at least two of said rings are radially nested in a stack, with a first ring including a first internal annular surface and an opposed first external peripheral line bearing surface formed at a diameter from the spool axis; and a second ring including a second internal annular surface and a second external peripheral line bearing surface of a greater diameter than the diameter of the first external peripheral line bearing surface; and wherein the first ring is releasably mountable to the forward spool flange of the line receiving spool, and wherein the second internal annular surface of the second ring is sized to be releasably received over the first external peripheral line bearing surface with the second external peripheral line bearing surface being positioned to guide fishing line from the spindle; and wherein the second ring may be selectively removed from the first ring to expose the first external peripheral line bearing surface such that the first external peripheral line bearing surface is positioned to guide fishing line from the spindle.

12. A fishing reel as defined by claim 8, wherein the external annular line bearing surface tapers to an annular edge.

13. A fishing reel as defined by claim 8 wherein the line receiving spool includes a ring receiving storage receptacle thereon.

14. A fishing line spool for fishing reels, comprising:
a line receiving spindle extending along a spool axis between forward and rearward ends;

a flange on the spindle at the forward end thereof;

a plurality of concentric rings in a nested configuration on the flange and including line bearing surfaces circumscribing the flange and substantially continuous about the spool axis;

said line bearing surfaces having differing diameters from the spool axis; and wherein the rings are configured to be successively removable from the flange.

15. A fishing line spool for fishing reels as defined by claim 14 further comprising a ring storage receptacle on the spool for receiving and storing rings removed from the nested configuration.

16. A fishing line spool as defined by claim 14, wherein the line bearing surfaces taper to annular edges.

17. A fishing line spool as defined by claim 14, wherein the line bearing surfaces each include two axially opposed peripheral bearing surfaces, and wherein each of said rings is configured to enable axially reversible positioning of said peripheral bearing surfaces on the flange.

18. A fishing line spool as claimed by claim 14, wherein said rings are each comprised of an elastic material.

19. A fishing line spool as defined by claim 14 further including an expansion joint on at least one of the rings.

20. A fishing line spool as claimed by claim 14, wherein said rings are each comprised of an elastic material, and further including an expansion joint on at least one of the rings.

* * * * *

UNITED STATES PATENT AND TRADEMARK OFFICE
CERTIFICATE OF CORRECTION

PATENT NO. : 5,785,266
DATED : July 28, 1998
INVENTOR(S) : Ross W. Bowersox

It is certified that error appears in the above-identified patent and that said Letters Patent is hereby corrected as shown below:

The title page should be deleted to appear as per attached title page. In the drawings sheet 3 of 9 consisting of figure 3 should be deleted to appear as per attached.

In the Abstract:

Line 1: Replace "fairlead" with -- flange-- and after "described" insert a --.--.

Col. 1, l. 40: Delete "porions" and substitute therefore --portions--.

Col. 2, l. 52: Delete "real" and substitute therefore --reel--.

Col. 3, l. 13: After "It" insert --is--.

Col. 3, l. 32: Delete "on" and substitute therefore --an--.

Col. 4, l. 59: After "which" delete "a".

Col. 6, l. 26: After "having" insert --at--.

Signed and Sealed this

Second Day of March, 1999

Attest:

Q. TODD DICKINSON

*Attesting Officer*　　　*Acting Commissioner of Patents and Trademarks*

United States Patent [19]

Bowersox

[11] Patent Number: 5,785,266
[45] Date of Patent: Jul. 28, 1998

[54] VARIABLE DIAMETER FISHING LINE REEL FLANGE

[76] Inventor: Ross W. Bowersox, 315 W. Riverside, #607, Spokane, Wash. 99201

[21] Appl. No.: 745,785

[22] Filed: Nov. 8, 1996

[51] Int. Cl.$^6$ .................................................. A01K 89/01
[52] U.S. Cl. .................... 242/323; 242/322; 242/128; 242/140
[58] Field of Search ........................... 242/129, 128, 242/140, 322, 323, 593, 614, 607

[56] References Cited

U.S. PATENT DOCUMENTS

| | | | |
|---|---|---|---|
| 1,783,339 | 12/1930 | Mitchell | 141/140 |
| 2,535,746 | 12/1950 | Mitchell | 242/322 |
| 2,755,037 | 7/1956 | Sarah | 242/130 |
| 2,771,756 | 11/1956 | Burleson et al. | 242/128 |
| 2,957,641 | 10/1960 | Humphrey | 242/84.1 |
| 4,222,534 | 9/1980 | Ishida | 242/84.2 |
| 4,634,076 | 1/1987 | Eckert et al. | 242/118.7 |
| 5,161,751 | 11/1992 | Bolcavage | 242/322 |

*Primary Examiner*—Katherine Matecki
*Attorney, Agent, or Firm*—Wells, St. John, Roberts, Gregory & Matkin P.S.

[57] ABSTRACT

A variable diameter fishing reel fairlead is described. The diameter may be varied by provision of a number of rings that are radially nested at a forward flange of a spinning line spool, and that include individual line engaging bearing surfaces. Successive rings can be removed from the spool to progressively expose line engaging bearing surfaces of decreasing diameter as line on the spool diminishes in length.

20 Claims, 9 Drawing Sheets